April 20, 1926.

A. SCHOLER 1,581,550

VEHICLE TOY

Filed Jan. 10, 1925

Inventor
August Scholer
Jack Snyder

By

Attorney

Patented Apr. 20, 1926.

1,581,550

UNITED STATES PATENT OFFICE.

AUGUST SCHOLER, OF PITTSBURGH, PENNSYLVANIA.

VEHICLE TOY.

Application filed January 10, 1925. Serial No. 1,606.

*To all whom it may concern:*

Be it known that I, AUGUST SCHOLER, a citizen of the United States, residing at Pittsburgh, in the county of Allegheny and State of Pennsylvania, have invented certain new and useful Improvements in Vehicle Toys, of which the following is a specification.

This invention relates to a toy vehicle of the scooter type and important objects of the invention are to provide a device of the class stated, in a manner as hereinafter set forth which embodies a novel propelling mechanism for driving the vehicle while standing thereon in the upright position, and which has a resiliently mounted front end.

Further objects of the invention are to provide a vehicle of the character described which is simple in its construction and arrangement, strong, durable and efficient in its use, positive in its action, entertaining and comparatively inexpensve to manufacture.

To the accomplishment of these and such other objects as may hereinafter appear, the invention consists of the novel construction, combination and arrangement of parts herein specifically described and illustrated in the accompanying drawing wherein is shown an embodiment of the invention, but it is to be understood that changes, variations and modifications may be resorted to which come within the scope of the claims hereunto appended.

In the drawing forming a portion of this specification and wherein like numerals of reference designate corresponding parts throughout the several views:—

Figures 1, 2:
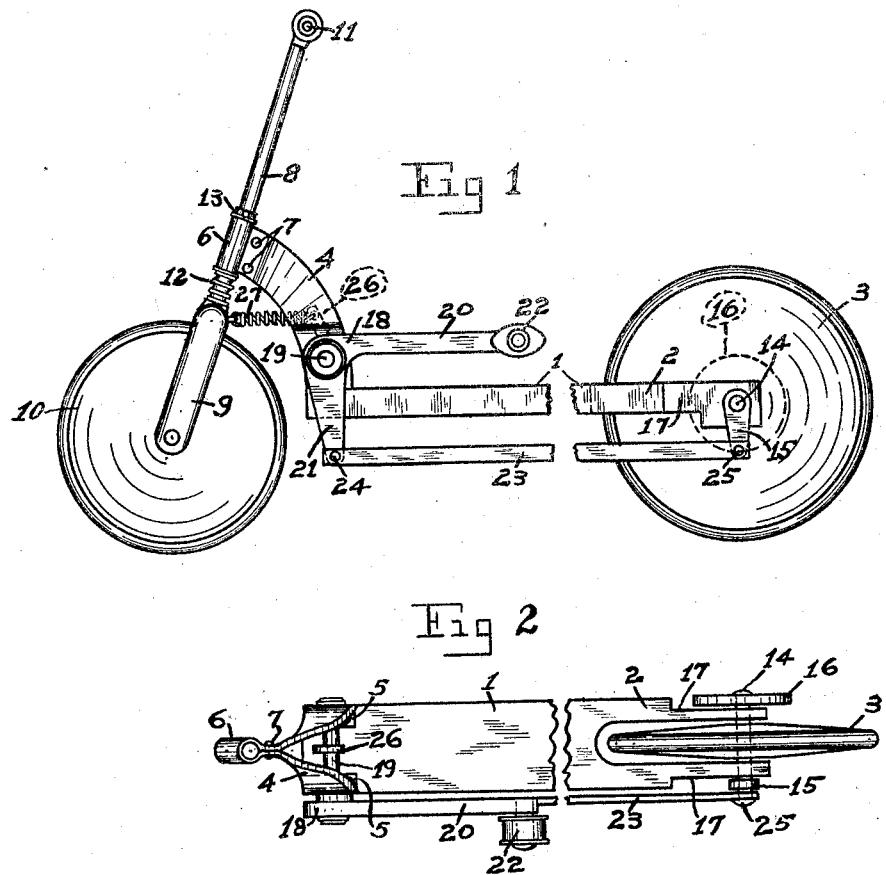
Figure 1 is a side elevation of a toy vehicle in accordance with my invention.
Figure 2 is a top plan view thereof with the steering wheel and stem removed.

Referring in detail to the drawing 1 denotes a flat elongated body portion provided with a bifurcated rear end 2, in which the rear wheel 3 is positioned.

A supporting bracket 4 is fixed on the top face of the body portion 1. The bracket 4 consists of a pair of spaced legs, the lower ends of which are secured as indicated at 5, to respective edge margins of the body portion 1, at the forward end thereof. The bracket 4 is disposed upwardly forward and the forward end thereof is formed to provide an angularly disposed sleeve 6 by the convergence of the upper portion of the bracket legs and their connection by the pins 7.

The steering stem 8 extends through the bracket sleeve 6 and is rotatable therein. The steering stem 8 has a forked lower end 9 in which the front or steering wheel 10 is rotatably mounted. The upper end of the steering stem 8 carries the steering crossbar 11.

A spiral spring 12 is mounted on the steering stem 8 intermediate of the upper end of the fork 9 and the lower end of the sleeve 6. The latter is vertically shiftable on the steering stem 8 and its engagement with the spring 12 provides a resilient mounting for the forward end of the vehicle. The upward shiftable movement of the sleeve 6, on the stem 8, is limited by the collar 13 mounted on the stem 8.

The rear wheel 3 is fixed on the shaft 14 which latter is suitably journaled in the bifurcated rear end 2, of the body portion 1. A crank arm 15 is fixed to one end of the shaft 14 and a fly-wheel 16 is fixed to the other end thereof. Each side edge of the bifurcated rear end 2, of the body portion 1 is formed with a recess 17 providing clearance for the crank arm 15 and fly-wheel 16, respectively.

A substantially L-shaped treadle member 18 is fixedly mounted to one end of the treadle shaft 19, which latter is suitably journaled for rotation in the supporting bracket 4. The treadle member 18 consists of a rearwardly extending arm 20 and a depending arm 21. A pedal 22 is pivotally connected to the rear end of the arm 20, and a connecting bar 23 connects the lower end of the depending arm 21 with the outer end of the crank arm 15, as indicated at 24 and 25, respectively.

A vertically disposed arm 26 is fixed to the shaft 19 intermediate of the legs of the supporting bracket 4, and a spiral spring 27 connects the upper end of the arm 26 with the upper end of the steering stem fork 9. The action of the spring 27 normally tends to maintain the alignment of the wheels 3 and 10 relatively to each other and further aids in the propulsion of the vehicle as hereinafter stated.

The operation of the treadle member 18, through its connection with the crank arm 15 by the connecting bar 23 will rotate the rear wheel 3 and propel the vehicle. The treadle member 18 is operated by the depression of the arm 20 by the foot of the operator and its return or elevation is effected by the action of the spring 27 and the momentum of the traveling vehicle augmented by the operation of the fly wheel 16. The fly wheel 16 also serves as an equalizer to counterbalance the propelling mechanism mounted on the opposite side of the body portion 1.

My improved vehicle toy will provide a novel and amusing toy requiring certain skill for its operation, and it will be noted that the principle of its construction and operation may be applied to vehicles having three and four wheels instead of two, as illustrated and described.

What I claim is:

1. A vehicle toy comprising a flat elongated body portion having a bifurcated rear end, a shaft journaled in said rear end, a wheel fixed on said shaft, a supporting bracket fixed to the forward end of said body portion, a steering stem shiftably mounted in said bracket, a steering wheel rotatably carried at the lower end of said stem, a crank arm fixed to one end of said shaft, a treadle member pivotally carried by said bracket, and a connecting bar pivotally connected with said crank arm and with said treadle member.

2. In combination, a toy vehicle, comprising a flat elongated body portion having a bifurcated rear end, a shaft rotatably journaled in said rear end, a wheel fixed to said shaft, a crank arm fixed to one end of said shaft, a fly wheel fixed to the other end of said shaft, a supporting bracket fixed to the forward end of said body portion, a treadle shaft rotatably journaled in said bracket, a steering stem, a wheel rotatably mounted in the lower end of said stem, said bracket having a resilient and rotatable connection with said stem, a treadle member fixed to said treadle shaft, a connecting bar pivotally connected with said member and with said crank arm, and a resilient member connecting said treadle shaft with said steering stem, substantially as described and for the purpose set forth.

3. In combination, a vehicle toy comprising a flat elongated body portion having a bifurcated rear end, each marginal side edge of said rear end being recessed, a rear shaft journaled for rotation in said bifurcated rear end, a rear wheel fixed on said rear shaft, a fly wheel fixed to one end of said rear shaft and a crank arm fixed to the other end thereof, said fly wheel and crank arm respectively positioned in said recesses, a supporting bracket consisting of a pair of spaced legs at their upper ends, the upper converging ends of said pair of legs formed to provide a sleeve and the lower ends of said legs fixedly secured to the forward end of said body portion, a steering stem extending through said sleeve to permit of its rotation and vertical movement therein, the lower end of said stem formed to provide a fork and a steering wheel rotatably mounted in said fork, a spiral spring carried on said stem intermediate said fork and said sleeve, means carried by said stem for limiting the upward vertical movement of said sleeve on said stem, a treadle shaft journaled for rotation in said pair of bracket legs, a treadle member fixed to one end of said treadle shaft, a connecting bar connecting said treadle member and said crank arm, the reciprocating movement of said treadle member imparting a rotary movement to said crank arm and associated rear wheel for propelling said vehicle, an upwardly disposed arm fixed to said treadle shaft intermediate of said bracket legs, and a resilient element connecting said last mentioned arm with said steering stem for normally maintaining the said steering wheel in alignment relatively to the said rear wheel and for aiding the reciprocation of said treadle member during the propelling operation, substantially as described and for the purpose set forth.

In testimony whereof I affix my signature.

AUGUST SCHOLER.